Nov. 1, 1960 C. E. KEENE 2,958,131
HAND ENGRAVER
Filed Dec. 5, 1958 4 Sheets-Sheet 4

INVENTOR.
CARL E. KEENE
BY
ATTORNEYS

United States Patent Office 2,958,131
Patented Nov. 1, 1960

2,958,131

HAND ENGRAVER

Carl E. Keene, 13809 East Ave. G-8, Lancaster, Calif.

Filed Dec. 5, 1958, Ser. No. 778,547

5 Claims. (Cl. 33—23)

(Granted under Title 35, U.S. Code (1952), sec. 266)

The invention described herein may be manufactured and used by or for the United States Government for governmental purposes without payment to me of any royalty thereon.

This invention is an engraving device and has for an object a hand engraver in which the engraving means is carried by a portable body member and is directed over the surface to be engraved by a tracer pin moving in character grooves formed in a templet and a tail pin movable in a groove in the templet parallel with the line of lettering or characters formed in the templet.

A further object is the provision of a light, portable hand engraver tool in which the engraving means is a rotary cutter of the router type and is power driven.

A further object is the provision of improved chuck means disposed on a vertical spindle journalled in the body for chucking the engraving or cutting tool and means for readily and easily releasing the cutter for adjustment, removal or replacement.

A further object includes an engraving tool in which the cutting spindle has a collet type chuck and includes spring detent means provided for locking the chuck and means for rotating the collet while the chuck is locked to loosen the cutting stylus for removal or replacement.

A further object includes stop means carried by the cutter or collet spindle for adjusting the cutting depth of the routing cutter.

A further object includes a portable hand engraving tool having a power driven vertical cutter spindle with an electric motor for rotating the spindle and suction producing means driven by the motor in which a suction nozzle is provided next to cutter stylus in communication with the suction producing means and a vented container formed in the body in communication with said suction means for receiving the cutter dust withdrawn through said nozzle during the operation of the device.

A further object is the provision of a suction nozzle adjacent the cutter head having a supporting or bearing surface for engagement with the surface of the work being engaged to support one end of the body of the engraver adjacent the cutter spindle.

A further object is the provision of an engraving cutter for use with lettering guides such as shown in A. W. Keuffel Patents 2,011,195; 2,050,058 and R. W. Anderson Patents 2,616,179 and 2,720,030 in which the body is formed with a tail pin adjacent one end adapted to ride in the straight groove of the templet and a guide pin disposed to ride in the groove in the templet forming the characters, in which the guide pin is mounted on the end of a lever arm pivotally adjustable on the underside of the body.

A further object is the provision of an engraving cutter tool having a power driven engraving stylus and lamp means on the underside of the body adjacent the cutter stylus with an electric circuit incorporated in the body for operating the power means and illuminating the lamp means.

Other objects and advantages will become apparent from the following description and accompanying drawings in which like reference characters refer to like parts in the several figures.

Figure 5 is a horizontal longitudinal sectional view taken about on the plane indicated by line 5—5 in Figure 4 looking in the direction of the arrows.

Figure 8 is a schematic view of the wiring circuit within the body for operating the motor and energizing the lamp.

Figure 1:
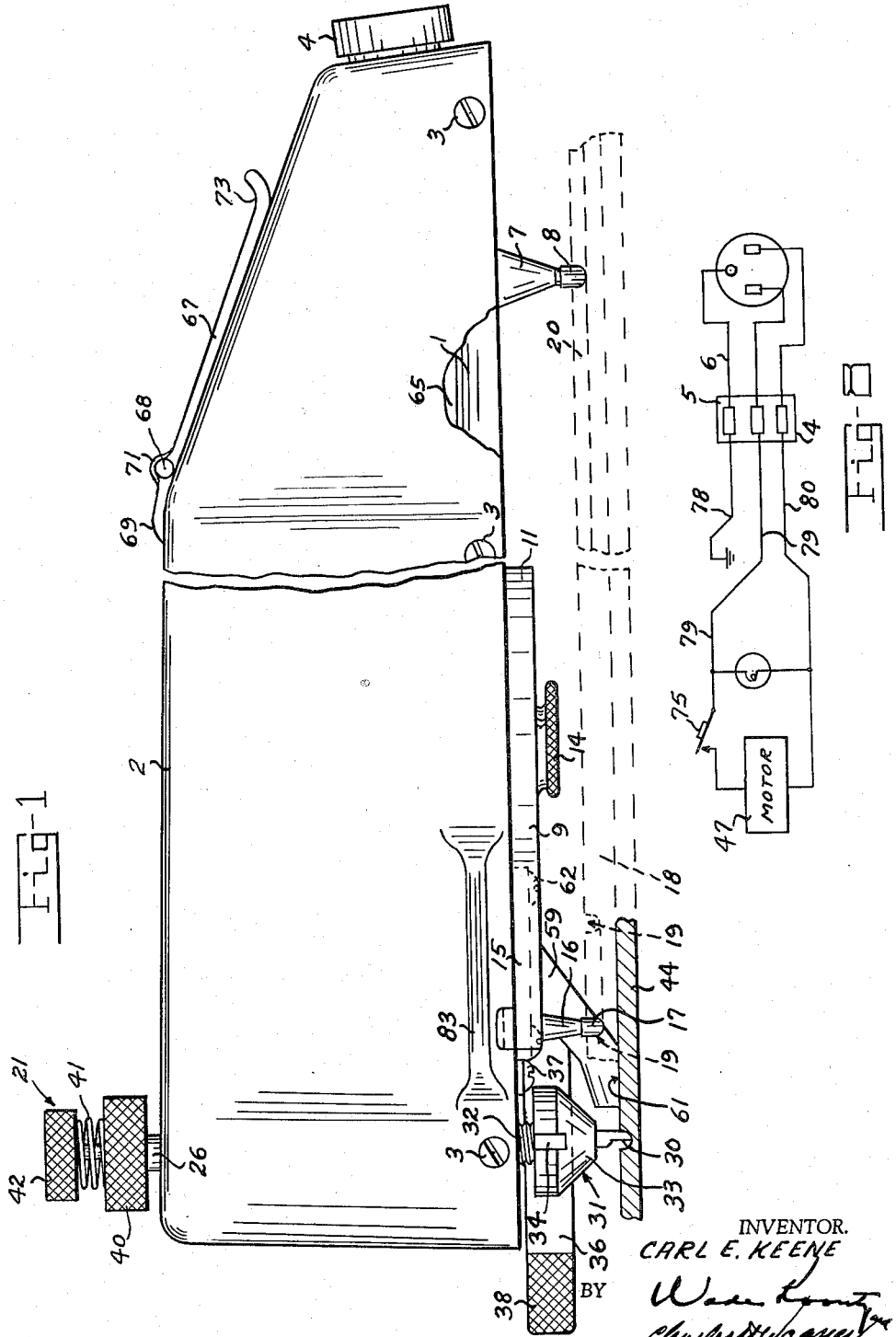
Figure 1 is a side elevation of my improved hand engraver parts being broken away and foreshortened with a portion of a panel being engraved shown in section and a portion of one of the characters and letters templets shown on dotted lines.

Referring to the drawing, and more particularly to Figure 1 my improved lettering hand engraver comprises a base plate 1 having an inclosing case or cover 2 which fits over the edge of the base plate 1 and is secured thereto by screw fasteners 3. At the rear end of the cover is the power connector or plug socket 4 having three terminals for receiving the contact terminals of a matching connector plug 5 attached to a three-wire flexible conductor 6 shown schematically in Figure 3, having a polarized plug adapted to be plugged into a suitable conventional electrical socket for supplying electrical power to the engraver.

Projecting downwardly from the rear end of the base plate 1 is a tapered templet guide post 7 having a heavily chrome plated rounded end 8 adapted to be inserted in the straight guide passage in a conventional templet similar to the longitudinal groove in the templet shown in the patents to Keuffel and to Anderson before referred to.

Figure 2:
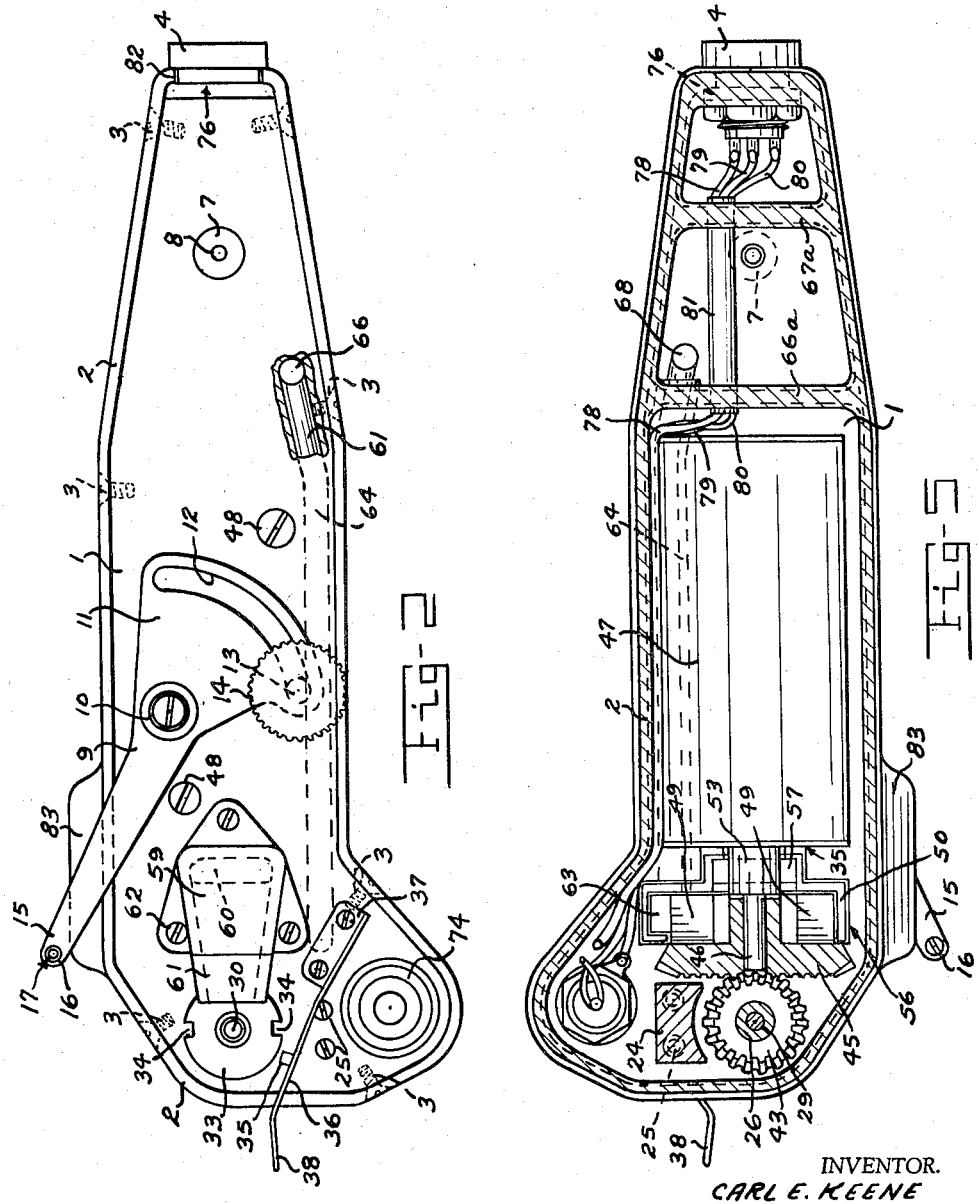
Figure 2 is a bottom plan view of the device shown in Figure 7, part of the base being broken away to show the "cored" passage therein.

As seen in Figure 2 the base plate 1 has pivoted thereon a lever arm 9 pivoted at 10 carrying an arcuate slotted segment 11 having an arcuate slot 12 through which an adjustment clamping screw 13 extends into a suitably threaded opening in the base plate 1, the screw 13 having a large and preferably knurled head 14 for clamping the lever arm 9 in any selected adjusted position. The lever arm 9 projects away from the pivot 10 to one side of the plate 1 and carries on the outer extension 15 thereof a templet figure or character guide post 16 having a heavily chrome plate end 17 adapted to fit and slide in the character or figure grooves of the templet.

In Figure 1 the templet is shown in dotted lines and indicated at 18 and has the usual character or letter guide grooves 19 for the reception of the end 17 and the longitudinal groove or channel 20 parallel to the characters forming the grooves 19 and receiving the end 8 templet guide post 7.

Figure 3:
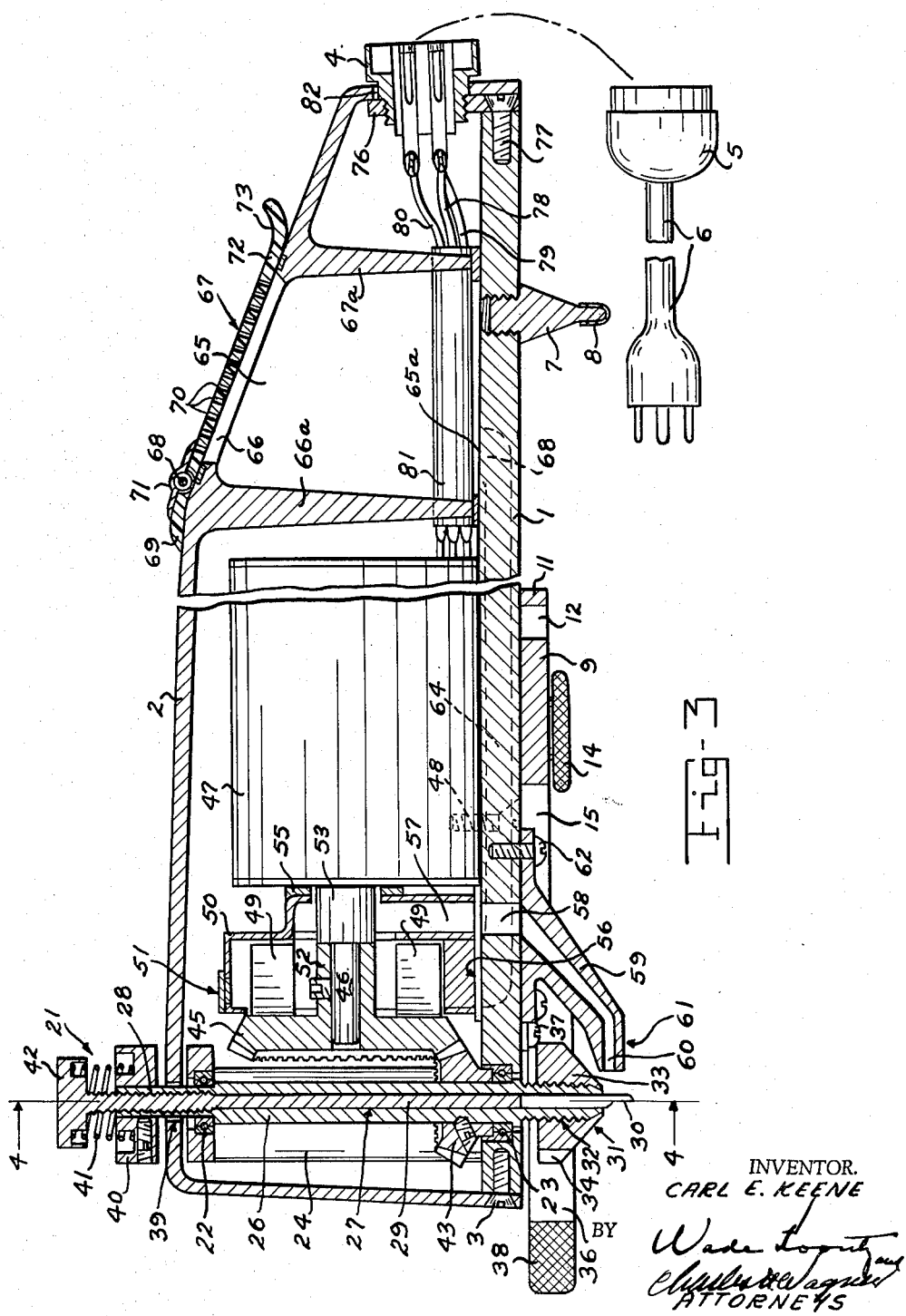
Figure 3 is a vertical longitudinal sectional view through my hand engraver parts being broken away and foreshortened showing the assembly of parts.
Figure 4:
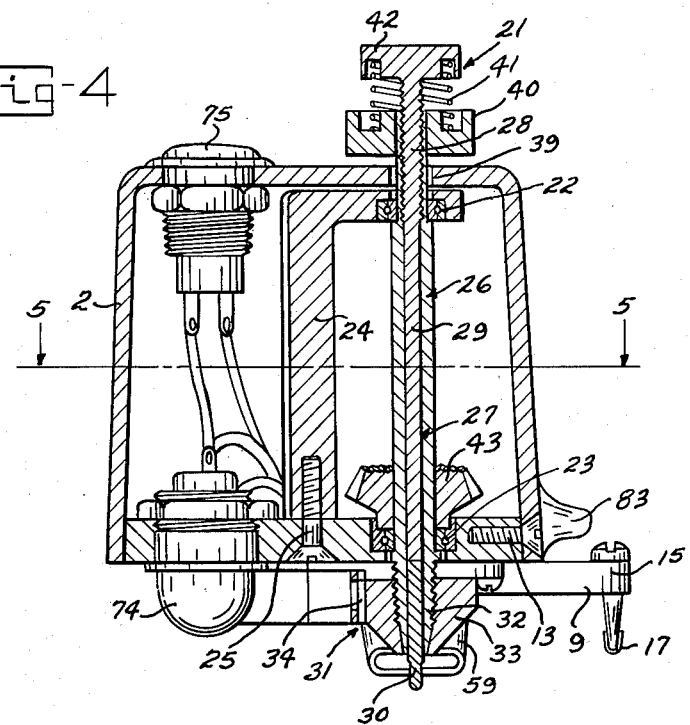
Figure 4 is a transverse vertical sectional view taken about on the plane indicated by line 4—4 in Figure 3 looking in the direction of the arrow.

My device is provided with a rotary cutter assembly indicated generally at 21 best seen in Figures 3, 4 and 5.

The cutter assembly 21 is supported in position perpendicular to the base plate 1 by upper and lower ball bearings 22 and 23, the lower bearing being seated in a recess in the plate 1 while the upper bearing is carried in a post or bracket 24 fixed on the upper surface of the plate 1 by screws 25.

The spindle proper is indicated at 26 having a bore 27 threaded at its upper end at 28 to receive a central axial adjustment or stop rod 29 for limiting the upper position of the rotary engraving cutter or router tool 30.

The router or cutter 30 is retained in the bore 27 against the lower end of the rod 29 by a collet type chuck 31 having conventional camming surfaces and threaded on the lower end of the spindle 26 at 32.

The chuck or collet clamping head 33 is formed with longitudinal recesses or cuts 34 disposed to be engaged by an abutment 35 on the adjacent face of a leaf spring arm 36 secured to the underside of the plate 1 by screws 37 as seen in Figure 2. The spring 36 normally spaces the abutment or lug 35 away from the side of the chuck head for clearance but is provided with a finger or handle portion 38 whereby the spring can be bowed to bring the lug 35 into locking engagement with chuck head 33 whereby the spindle 26 may be rotated relative to the chuck head 33 to tighten or loosen the engraving tool 30 in the collet for removal, adjustment, or replacement of the cutter 30.

In order to manually rotate the spindle for the aforesaid collet adjustment the upper end of the spindle is reduced in diameter to form an abutment for the upper bearing 22 and extends through a suitable opening 39 in the top of the case 2 and has suitably fixed thereon a knurled thumb screw or disk adjustment means 40 having a recessed upper surface forming a spring seat for a light compression coil or "drag" spring 41, the upper end of the compression coil spring 41 being seated in an annular recess in a knurled thumb screw or disk 42 formed or fixed on the upper end of the adjusting or stop rod 29. The spring 41 is under compression sufficient to provide functional drag to resist accidental rotative adjustment of the rod 29 relative to the spindle during operation of the device.

Suitably splined, or keyed, or set screw secured on the spindle 26 immediately next to the bearing 23 is a bevel gear 43 for spinning the spindle shaft and engraving tool carried thereby while in engagement with the work, such as the panel or sheet 44 as shown in Figure 1.

Referring to Figure 3 the bevel gear 43 meshes with a larger bevel gear 45 fixed on the end of a power shaft 46 of an electrical motor 47, the motor 47 being suitably secured on the upper surface of the plate 1 by screws or other fasteners 48. The bevel gear 45 as best seen in Figures 3, 5, 6 and 7 has a plurality of impeller blades 49 projecting rearwardly therefrom into a centrifugal suction or vacuum pump casing 50. The casing 50 as seen in the drawing is of the volute type and has an access 51 plug in the top for access to the set screw fixing the hub portion 52 of the bevel gear 45 on the shaft 46 against the shaft bearing or motor casing 53. The casing 50 is sealed at its center around the shaft bearing 53 by an annular gasket 55 and against the top surface of the plate 1 by the gasket 56, the front of the casing being, of course, closed by the rear face of the bevel gear 45.

An air or suction inlet passage 57 in the pump casing 50 is disposed in communication with a similar shaped opening 58 extending through the base plate 1 and a suction nozzle 59 is secured to the bottom surface of the plate 1, inclined downwardly and then horizontally to a position as shown in Figures 2, 3 and 4 immediately behind the cutter or router tool 30. The nozzle 59 has a forwardly tapering wide suction passage 60 therethrough and lower surface of the outer end portion of the nozzle 59 is flat and heavily chrome plated at 61 and constitutes a support or foot for resting on the work surface or panel 44 close to the engraving tool 30 to support the front end of the engraver on the panel 44 and maintains the lower end of the cutter 10 at the proper, predetermined adjusted depth in the panel 44 during engraving. The nozzle 59 is secured to the plate 1 by screws 62.

Figure 7:
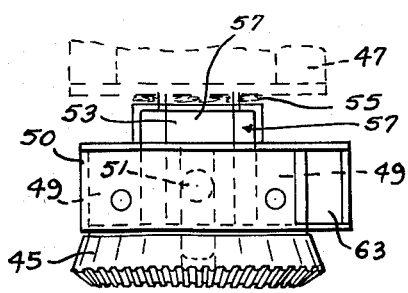
Figures 6 and 7 are detail end and bottom views of the details of the suction device or vacuum pump.
Figure 6:
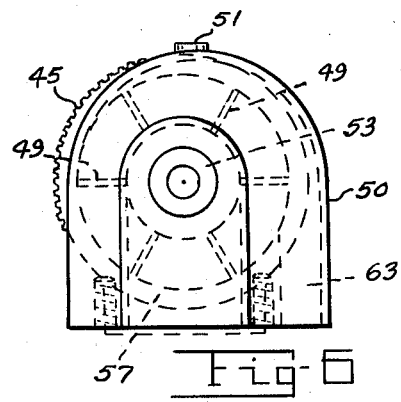

The blower or suction pump casing 50 as shown in Figures 6 and 7, is provided with an offset or peripheral exhaust passage 63 which extends through the gasket 56 into communication with a cored, or suitably formed, passage 64 in the base plate 1 extending rearwardly to a point below a tank or collection chamber 65 formed by the cross partitions 66ª and 67ª which extend downward inside of the cover 2 and seat on a gasket 65ª on the base plate 1.

The passage 64 extends upwardly at 68 into communication with the interior of the collection chamber 65. The top of the casing or cover 2 between the partitions 66ª and 67ª is provided with an opening 66 for emptying the chamber 65, this opening 66 being closed by a door member 67 hinged at 68 to a hinge member 69 firmly secured to the outer surface of the cover 2, for instance, by a suitable cement. The door or closure 67 is preferably finely perforated to form a screen as at 70 to allow seepage or discharge of air out of the chamber 65, and the door is preferably urged to its closed position as shown by suitable spring means 71, the door in closed position resting on the cushion or felt gasket 72 surrounding the opening 66. The door has a lip or handle portion 73 for opening the same to empty the compartment 65 of dust or cutting sucked and discharged therein from the engraving tool 30.

As seen particularly in Figures 2 and 4 an electric lamp 74 is mounted in a suitable aperture provided in the base plate 1 adjacent or opposite the cutter spindle chuck 33 so as to illuminate the surface of the panel being engraved around the cutter bit 30.

Immediately above the lamp 74 and mounted in an aperture provided in the top of the case or cover 2 is an operating button or switch element 75.

The electrical plug socket 5, as seen in Figures 2 and 3 is mounted on a plate 76, preferably of fibre or insulation which is fastened to the base plate 1 by screws 77 and the three conductor wires 78, 79 and 80 from the plug extending forwardly through a tubular conduit 81 which extends through the base of the partitions 66ª and 67ª to a point adjacent the rear end of the motor 47. From this point one of the wires as seen in Figure 8 for instance the wire 78 is grounded on the frame or plate 1 while the other two wires 79 and 80 are connected to the motor 47 with the lamp 74 shunted across the latter two wires and the switch button 75 interposed in the circuit to the motor between the lamp 74 and the motor 47. The rear end of the cover 2 is notched at 82 to receive the intermediate portion of the plug socket 4. The three wire polarized connector 6 provides means for grounding the engraving tool through the usual polarized wall outlet in a conventional manner not shown.

The case or cover 2 is streamlined with rounded corners so the engraving tool may be easily and conveniently held in the hand and is provided with a thumb rest 83.

As before mentioned the device is preferably used with a conventional well known elongated lettering templet 18 in which a straight guide groove or channel 20 is formed in the top surface of the templet 18 parallel to the longitudinal edge of the templet, and a plurality of guide letters or numbers are grooved at 19 in the top of the templet in equal offset distances from the straight guide groove or channel 20.

In the operation of the device the rear guide end 8 of the guide post 7 is inserted in the straight guide channel 20 and the other offset guide finger end 17 on the arm extension 15 is placed in the desired letter or number guide groove 19 and the cutter or router bit 30 being properly adjusted for depth of cut desired by loosening the collet chuck 31 and manipulation of the stop or limit rod 29 by rotative adjustment of the thumb screw 42, and subsequent tightening of the cutter chuck head 33.

When the tool is plugged in the lamp 74 is lighted. The switch 75 is closed to energize the motor 47 to spin the cutter 30 through the bevel gears 45 and 43. The cutter sinks into the panel 44 until the chrome plated bottom 61 of the nozzle 59 rests on the top surface of the panel being engraved. The spinning blades 49 on the bevel gear 45 within the casing 50 causes suction in the nozzle entrance 60 which sucks in cuttings made by the cutter 30 as the tool is manually manipulated in the hand of the operator, these cuttings being discharged from the impeller casing 50 through the discharge passages 63 and 64 into the collection chamber 65, air escaping from the chamber 65 through the fine opening or perforations 70 in the door closure 67.

The guide pin or finger 16 is made to trace the groove forming the characters or letters in the templet 18 and the engraving tool duplicates these characters or letters in the work sheet or panel 44. The base of the nozzle gliding easily on the top surface of the panel 44 studies the tool and causes the depth of cut made by the cutter 30 to be uniform.

If a deeper cut is desired the collet chuck 31 is loosened and thumb screw 42 turned to lower the stop rod 29. If a more shallow groove is desired to be cut the process is reversed. This adjustment must, of course, be made when the motor 47 is not energized, and when the adjustment is desired, or for replacement of a cutter 30. The operator first presses the spring arm 36 toward the chuck head 33 to dispose the abutment or lug 35 in one of the locking recesses 34 on the chuck head 33. This, of course, locks the chuck head 33 against rotation after which the knurled thumb nut or disk 40 fixed on the upper end of the spindle 26 can be rotated to loosen the collet end of the spindle in the chuck head 33. The stop rod 29 can now be rotated to adjust the same axially to move the lower end thereof which abuts the upper end of the cutter 30, or the cutter 30 may be removed or replaced.

Rotation of the thumb nut 40 in the opposite direction while maintaining the chuck head locking pressure on the spring 36 against the chuck head 33 again tightens the collet to secure the cutter 30 firmly in the collet in the lower end of the spindle.

Loosening the adjustment screw 13 and changing the angular position of the adjustable lever arm 9 changes the slant of the characters or letters being engraved with reference to those on the templet.

For purposes of exemplification a particular embodiment of the invention has been shown and described to the best understanding thereof.

However, it will be apparent that changes and modifications in the arrangement and construction of the parts thereof may be resorted to without departing from the true spirit and scope of the invention as defined in the claims.

I claim:

1. A portable power engraving device comprising; an elongated hollow body, having a bottom adapted to be disposed substantially parallel to a flat surface to be engraved, an engraving spindle rotatably journalled in said body having a lower end projecting through the bottom of said body and an upper end projecting through the opposite side of the body, a collet chuck on the lower end of the spindle adapted to receive a rotary engraving cutter therein, a chuck head threaded on the lower end of the spindle for tightening said collet chuck to secure a rotary engraving cutter therein, a thumb wheel fixed to the upper end of said spindle for rotating the spindle in opposite directions relative to the chuck head to tighten or loosen the collet, said chuck head having a locking recess therein, locking means carried by said body for locking engagement with said recess to hold the chuck head against rotative adjustment while the spindle is rotatively adjusted by said thumb wheel, a motor fixed within said body, gear means between said motor and said spindle for rotation of said spindle by said motor, guide pin means projecting from one end of the body remote from the spindle adapted for guiding engagement with a straight groove in an engraving templet having a plurality of letter and character forming guide grooves therein parallel to the straight groove and forming a first point of support for said end of the body, a laterally adjustable guide arm pivoted to the bottom of said body and extending to a point remote from the first guide pin at one side of the body in spaced relation to the axis of said rotary spindle, a second guide pin fixed on the outer end of said arm and extending downwardly in spaced parallel relation to the first guide pin and adapted for selective guiding engagement with the letter and character forming guide grooves in the templet and forming a second point of support for said body, a suction nozzle fixed to the bottom of the body having a suction opening therein disposed in the immediate vicinity of a rotary engraving cutter when mounted in the collet, said nozzle having a lower bearing surface adapted to rest on the surface to be engraved to form a third point of support for the body immediately adjacent the collet chuck head for limiting the depth of cut of an engraving cutter in a surface to be engraved when the cutter is fixed in the collet, a rotary suction pump disposed in the body and connected to the motor for operation thereof, said body having a suction conduit formed therein between said suction nozzle and pump.

2. Apparatus as set forth in claim 1 in which said body is formed with a collection chamber therein disposed in communication with the discharge side of said suction pump to receive the discharge therefrom, said body having an access opening therein opening into said chamber, and a door closure for said access opening carried by said body having a venting aperture therein for discharging air pressure from said chamber.

3. Apparatus as claimed in claim 2 in which the spindle has a hollow threaded bore therethrough, and includes a threaded stop rod therein rotatably adjustable to adjust the rod axially in said spindle adapted to engage the upper end of an engraving cutter when disposed in said collet to adjustably position the cutting end thereof relative to the bearing surface of said nozzle, a thumb adjusting means fixed on the upper end of said stop rod adjacent the first mentioned thumb wheel on the spindle, and means between said spindle and said stop rod for yieldably resisting relative rotary adjustment therebetween.

4. A portable hand engraving power tool comprising; a flat elongated base plate having a peripheral edge, a bottom side, a top side and a relatively wider front end, a spindle support fixed to the top side of said base plate adjacent said front end, a hollow spindle, means rotatably journalling said spindle intermediate its upper and lower ends in said spindle support and in said base plate perpendicular to the bottom of said base plate, a bevel gear fixed on said spindle intermediate the journal means for rotating the spindle, a blower casing fixed to the upper side of the base plate having a suction inlet and a discharge outlet, a motor fixed on the upper side of the base plate having a drive shaft with one end projecting into the blower casing, a bevel gear fixed on said one end of said shaft forming a closure for one face of the blower housing, said bevel gear disposed in meshing driving relation with said bevel gear on said spindle and formed with impeller blades thereon extending into said blower housing, forming with said casing impeller suction pump means, a supporting suction nozzle fixed to the bottom of said base plate having a suction inlet immediately adjacent the lower end of said spindle, a suction passage formed in the base plate between the suction nozzle and the suction inlet of said blower casing, a suction discharge conduit formed in the base plate extending from the blower casing discharge outlet rearwardly under said motor in a direction away from said front end and opening upwardly through the top side of said base plate intermediate the motor and the rear end of the base plate, a hollow inclosing cover casing secured to peripheral edge of said base plate inclosing the upper surface of the base plate, said motor, bevel gears and said impeller suction means, said cover having a collection chamber formed therein over said opening in the upper surface of the base plate for the suction discharge conduit for receiving the discharge therefrom, said cover having an access opening formed therein for said collection chamber, a screen closure for said access opening pivoted to said cover, fixed supporting guide pin means projecting downwardly from the rear end of said base plate, laterally adjustable supporting guide pin means pivoted to the bottom of said body in laterally adjustable offset relation to the supporting bottom of said suction nozzle, collet chuck means on the lower end of the spindle for receiving an engraving cutter therein, including a rotatably adjustable chuck head, resilient chuck head adjusting means on the bottom of said base plate movable into holding engagement with said chuck head for resisting rotation of said chuck head relative to said spindle, said cover having an aperture therein through which the upper end of said spindle projects, and a thumb wheel means fixed on the upper end of the spindle for rotating the spindle manually relative to the chuck head for adjusting the collet chuck means for securing, adjusting and removing a rotary engraving cutter tool from the collet chuck means when the cutter is disposed in said collet.

5. Apparatus as set forth in claim 4 in which said hollow spindle is threaded internally and a stop rod is rotatably threaded in said spindle for axial adjustment in said spindle, said rod having a lower end for limiting the degree of insertion of an engraving cutter in the collet chuck means, said stop rod extending outwardly beyond the upper end of said spindle, and adjusting means on the upper end of the stop rod adjacent said thumb wheel on said spindle for rotatably adjusting said stop rod in said spindle.

References Cited in the file of this patent

UNITED STATES PATENTS

| | | |
|---|---|---|
| 1,705,957 | Braren | Mar. 19, 1929 |
| 2,011,195 | Keuffel | Aug. 13, 1935 |
| 2,177,347 | Sedelmeyer et al. | Oct. 24, 1939 |
| 2,616,179 | Anderson | Nov. 4, 1952 |
| 2,631,375 | Gleason | Mar. 17, 1953 |
| 2,699,606 | Breau | Jan. 18, 1955 |
| 2,809,566 | Orchard | Oct. 15, 1957 |